United States Patent
Lee et al.

(10) Patent No.: US 7,524,210 B2
(45) Date of Patent: Apr. 28, 2009

(54) BACKLIGHT UNIT AND LIQUID CRYSTAL DISPLAY DEVICE HAVING THE SAME

(75) Inventors: Young-Eun Lee, Daegu (KR); Seung-Hyun Lee, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/005,624

(22) Filed: Dec. 28, 2007

(65) Prior Publication Data

US 2008/0214024 A1    Sep. 4, 2008

(30) Foreign Application Priority Data

Jan. 30, 2007    (KR) .................... 10-2007-0009674

(51) Int. Cl.
*H01R 13/66* (2006.01)

(52) U.S. Cl. .................. 439/620.02; 362/225; 362/634; 349/152

(58) Field of Classification Search .................... 439/68, 439/56, 72, 612, 620.01, 620.02, 620.15; 362/225, 600–634; 349/149, 152, 61–71; 345/102

See application file for complete search history.

(56) References Cited

U.S. PATENT DOCUMENTS

| | | | | |
|---|---|---|---|---|
| 4,275,945 | A * | 6/1981 | Krantz et al. | 439/608 |
| 5,290,191 | A * | 3/1994 | Foreman et al. | 439/225 |
| 6,290,514 | B1 * | 9/2001 | McHugh et al. | 439/108 |
| 6,960,891 | B2 * | 11/2005 | Park et al. | 315/229 |
| 7,241,175 | B2 * | 7/2007 | Johannes et al. | 439/620.05 |
| 7,314,304 | B2 * | 1/2008 | Ahn et al. | 362/631 |
| 7,341,370 | B2 * | 3/2008 | Kim et al. | 362/634 |
| 7,434,957 | B2 * | 10/2008 | Kim et al. | 362/225 |

\* cited by examiner

*Primary Examiner*—Khiem Nguyen
(74) *Attorney, Agent, or Firm*—McKenna Long & Aldridge LLP

(57) ABSTRACT

A capacitive connector for a backlight unit having a light source including: a first conductive layer covering an end portion of the light source; an insulation layer covering an external surface of the first conductive layer; and a second conductive layer separated from the first conductive layer with the insulation layer interposed therebetween.

13 Claims, 4 Drawing Sheets

BACKLIGHT UNIT AND LIQUID CRYSTAL DISPLAY DEVICE HAVING THE SAME

This application claims the benefit of Korean Patent Application No. 10-2007-0009674 filed Jan. 30, 2007, which is hereby incorporated by reference for all purposes as if fully set forth herein.

BACKGROUND OF THE INVENTION

The present invention relates to a backlight unit and a liquid crystal display (LCD) device having the same, and more particularly, to an LCD device capable of improving the assembly characteristics and assembly stability and reducing the fabrication cost of backlight units.

DESCRIPTION OF THE RELATED ART

Recently, LCD devices, having the advantages of being thin and light, are increasingly used instead of cathode ray tube displays. The LCD device includes a liquid crystal panel, a backlight unit positioned at a rear side of the liquid crystal panel, and upper and lower covers combined to receive and support the liquid crystal panel and the backlight unit therein.

The backlight unit irradiates light onto a rear surface of the liquid crystal panel and includes a light source that typically generates light, an optical sheet disposed between the liquid crystal panel and the light source to improve luminance and uniformity of the light generated from the light source, and an inverter that supplies power to the light source. The light source is connected with the inverter via an electrical wire.

However, the structure that connects the light source and the inverter by using the electrical wire may have problems with the connection between the electrical wire and the light source or between the electrical wire and the inverter, for example a short-circuit. In addition, the connection may made be by soldering the electrical wire, thus fixing the electrical wire that deteriorates the assembly characteristics.

Recently, in order to solve the above problem and facilitate the connection between the light source and the inverter, a structure using a socket unit has been developed, and it will be discussed below.

With reference to FIG. 1, a structure that has a plurality of socket units 1 that are disposed on and separated from each other on a PCB (printed circuit board) 2. An electrode of each light source 3 is inserted into each socket unit 1.

The plurality of socket units 1 connect with each other in parallel via a circuit pattern formed on the PCB 2 and are connected with an inverter (not shown) through the PCB 2. The socket unit 1 is connected with an electrode of the light source 3, and the light unit 3 is driven upon receiving power from the inverter.

A plurality of capacitors 4 that control each light source 3 and supply uniform power to each light source 3 are formed on the PCB 2. Namely, power supplied from the inverter is distributed to each light source 3 according to the capacitance of each capacitor 4, and each light source 3 can be controlled by controlling the capacitance of each capacitor 4 to thus control the amount of power supplied to each light source 3. This method can be applied when cold cathode fluorescent lamps (CCFLs) having an electrode positioned therein are connected in parallel to each other.

However, this method has a problem in that the fabrication cost of the LCD device is increased because the capacitors 4 are additionally formed. In addition, the above-described socket units 1 are made of a somewhat hard material such as plastic, so they cannot effectively cope with an external impact. Thus, an electrical connection between the light source 3 and the socket unit 1 may deteriorate.

SUMMARY OF THE INVENTION

Accordingly, the present invention is directed to a backlight unit and liquid crystal display device having the same that substantially obviates one or more of the problems due to limitations and disadvantages of the related art.

An advantage of the present invention is to provide a liquid crystal display (LCD) device capable of improving assembly characteristics and assembly stability and reducing the fabrication cost.

Another aspect of the exemplary embodiments is to provide a backlight unit capable of improving assembly characteristics and assembly stability and reducing the fabrication cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a capacitive connector for a backlight unit having a light source including: a first conductive layer covering an end portion of the light source; an insulation layer covering an external surface of the first conductive layer; and a second conductive layer separated from the first conductive layer with the insulation layer interposed therebetween.

In another aspect of the present invention, a backlight unit for a display device including: a plurality of light sources; a plurality of capacitive connectors electrically connected to end portions of the light sources; a plurality of sockets into which capacitive connectors are inserted; and an inverter that supplies power to the light sources via the sockets and capacitive connectors, wherein the capacitive connectors include a first conductive layer covering the end portion of the light source, an insulation layer covering an external surface of the first conductive layer and a second conductive layer separated from the first conductive layer with the insulation layer interposed therebetween.

In another aspect of the present invention, a method of manufacturing a backlight unit having a light source including: forming a capacitive connector by: forming a first conductive layer with an opening that connects to the light source; forming an insulation layer covering an external surface of the first conductive layer; and forming a second conductive layer separated from the first conductive layer with the insulation layer interposed therebetween, electrically connecting the capacitive connector to an end portion of the light source; forming a socket; and inserting the capacitive connector into the socket connected to a power inverter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

A backlight unit and a liquid crystal display (LCD) device having the same according to the embodiments of the present invention will now be described.

Figure 1:
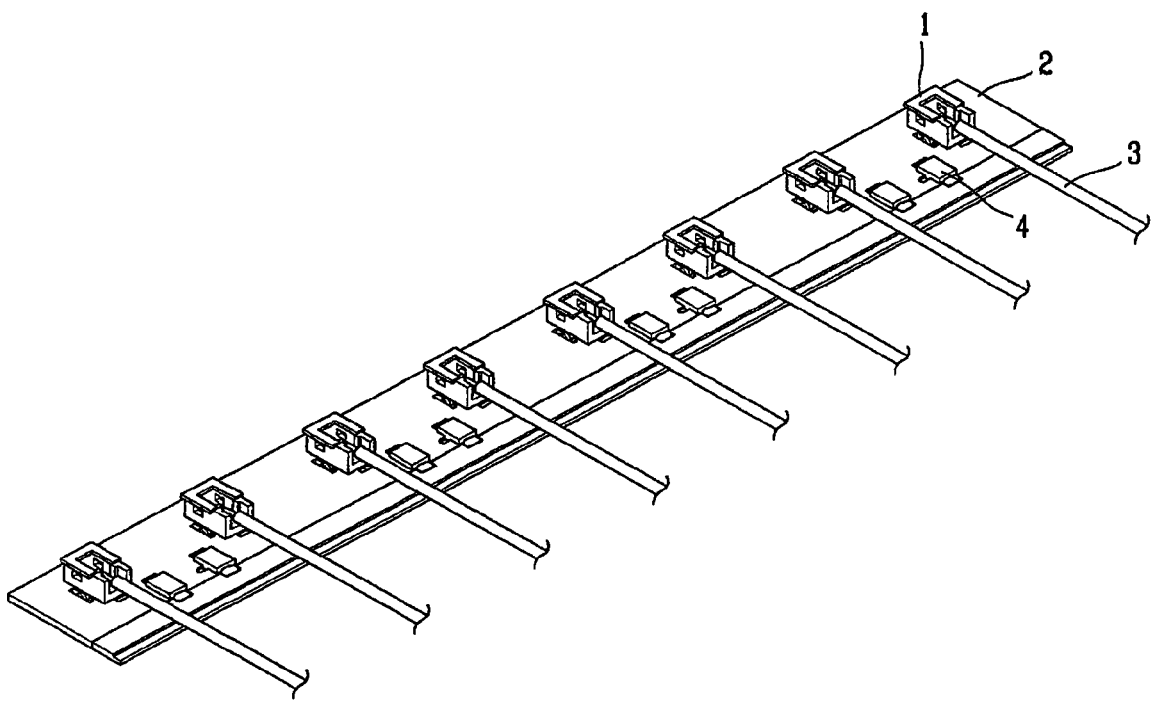
FIG. 1 is a view showing socket units of the related art.
Figure 2:
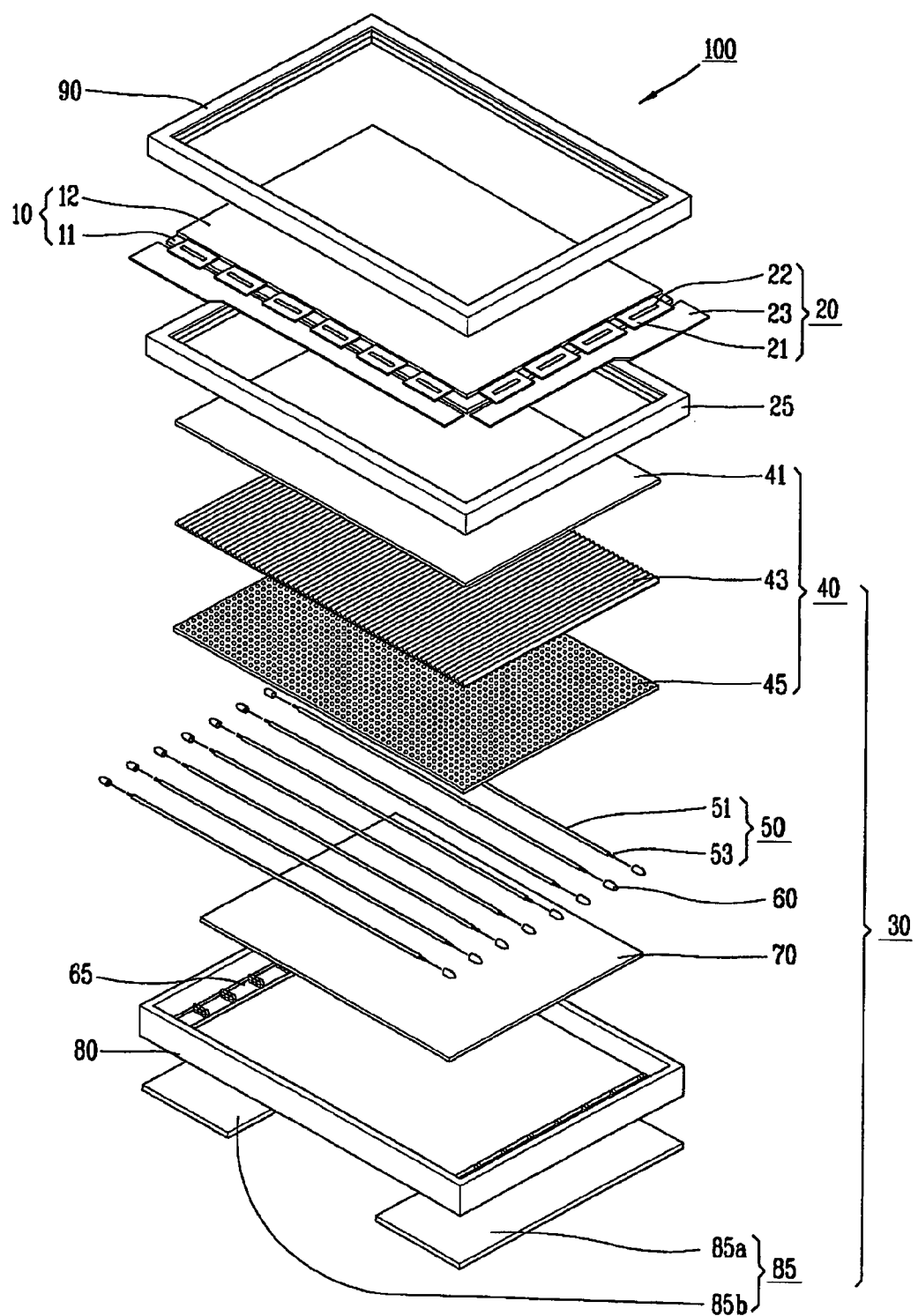
FIG. 2 is an exploded perspective view of a liquid crystal display (LCD) device according to a first embodiment of the present invention.
Figure 3:
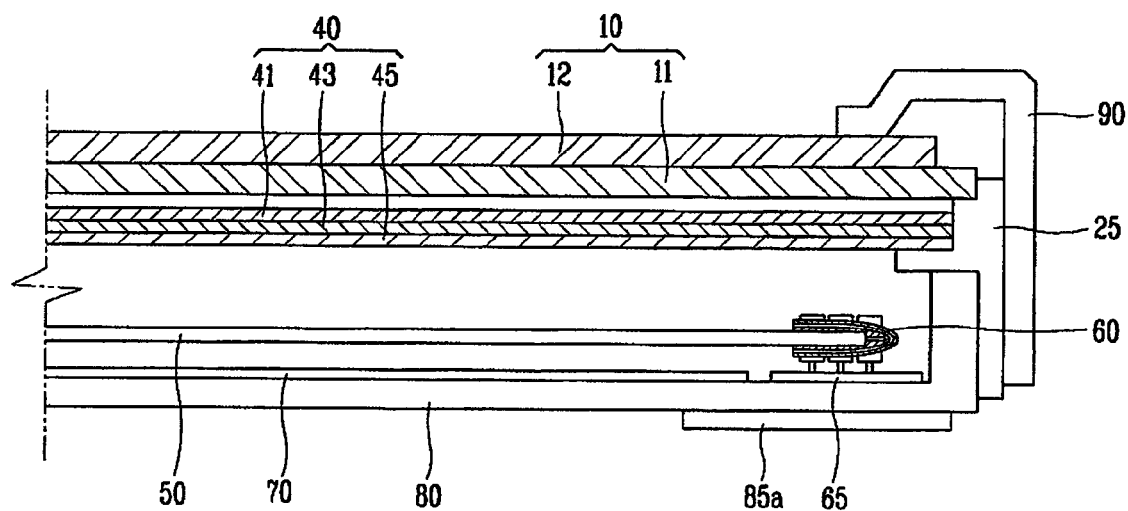
FIG. 3 is a sectional view of the LCD device according to the first embodiment of the present invention.

FIG. 2 is an exploded perspective view of a liquid crystal display (LCD) device according to a first embodiment of the present invention, and FIG. 3 is a sectional view of the LCD device according to the first embodiment of the present invention.

As shown in FIGS. 2 and 3, the LCD device 100 according to the first embodiment of the present invention includes a liquid crystal panel 10 that forms an image, a driver 20 that drives the liquid crystal panel, a mold frame 25 that supports edges of the liquid crystal panel 10, a backlight unit 30 that irradiates light to a rear surface of the liquid crystal panel 10, a lower cover 80 that accommodates the backlight unit 30 and supports the mold frame 25, and an upper cover 90 that is combined with the lower cover 80 and covers a front surface of the liquid crystal panel 10.

The liquid crystal panel 10 includes a thin film transistor (TFT) substrate 11, a color filter substrate 12 attached to and facing the TFT substrate 11, and liquid crystal (not shown) formed between the TFT substrate 11 and the color filter substrate 12. The liquid crystal panel 10 includes liquid crystal cells, making unit pixels, arranged in a matrix thereon that control the transmittance of the liquid crystal cells according to image signal information from the driver 20 to form an image.

A plurality of gate lines (not shown) and a plurality of data lines (not shown) are formed in a matrix on the TFT substrate 11, and TFTs (not shown) are formed at each crossing of the gate lines and the data lines. A signal voltage from the driver 20 is applied between pixel electrodes (not shown) and common electrodes (not shown) of the color filter substrate 12, and liquid crystal between the pixel electrodes and the common electrodes is aligned according to the signal voltage to vary the light transmittance.

The color filter substrate 12 includes red, green and blue color filters (not shown) that are repeatedly and alternately formed and divided by a black matrix (not shown), and a common electrode. The common electrode may be made of a transparent conductive material such as ITO (Indium Tin Oxide) or IZO (Indium Zinc Oxide). The color filter substrate 12 is smaller than the TFT substrate 11.

The driver 20 for applying driving signals may be formed at one side of the TFT substrate 11. The driver 20 includes a flexible printed circuit board (FPCB) 21, a driving chip 22 mounted on the FPCB 21, and a PCB 23 connected with the other side of the FPCB 21. The driver 20 as shown is a COF (Chip On Film) type driver, but a TCP (Tape Carrier Package) or COG (Chip On Glass) may also be applicable.

The driver 20 may be formed on the TFT substrate 11 by a wiring forming process. The driver 20 includes a terminal for an electrical connection, and the terminal of the driver 20 may be mounted on the TFT substrate 11 and connected with end portions of the gate lines and the data lines on the TFT substrate 11 extending from a display region to a non-display region.

The mold frame 25 is formed along the edges of the liquid crystal panel 10 and has a substantially rectangular shape. The mold frame 25 supports the liquid crystal panel 10 separately from the backlight unit 30.

The backlight unit 30 is positioned at the rear side of the liquid crystal panel 10. The backlight unit 30 includes an optical sheet 40 attached on the rear surface of the liquid crystal panel 10, a light source 50 disposed at a rear side of the optical sheet 40, a capacitive connector 60 into which an end portion of the light source 50 is inserted, a support member 65 that supports the capacitive connector 60, a reflection sheet 70 provided between the light source 50 and the lower cover 80 and allowing light irradiated from the light source 50 to evenly be reflected toward the rear surface of the liquid crystal panel 10, and an inverter 85 positioned at a rear side of the lower cover 80.

The optical sheet 40 includes a protection sheet 41 positioned on the rear surface of the liquid crystal panel 10, a prism sheet 43 and a diffusion sheet 45.

The diffusion sheet 45 includes a base plate and a coating layer with protrusions formed on the base plate. The diffusion sheet 45 diffuses light from the light source 50 to supply it to the liquid crystal panel 10. Two or three diffusion sheets 45 may be used in an overlapping manner.

The prism sheet 43 includes triangular prisms formed in a certain array on an upper surface thereof. The prism sheet 43 serves to redirect light diffused from the diffusion sheet 45 in a direction perpendicular to a planar surface of the liquid crystal panel 10. Two prism sheets 43 are used and microprism formed at each prism sheet 43 makes a certain angle. Light which has passed through the prism sheet 43 is mostly directed in a vertical direction to provide a uniform luminance distribution.

The protection sheet 41 is positioned on top of the other sheets to protect the prism sheet 43 which is susceptible to scratches.

Figure 4:
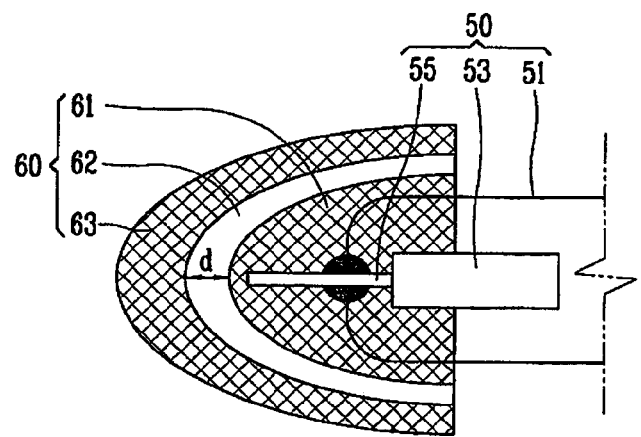
FIG. 4 is a view showing the structure of a capacitive connector according to the first embodiment of the present invention.

As shown in FIG. 4, the light source 50 includes a light source main body 51 that emits light, a light source electrode 53 formed at an end portion of the light source main body 51, and a connection pin 55 connected with the light source electrode 53 and exposed to the outside of the light source, and is driven by power received from the inverter 85. The connection pin 55 is inserted into a capacitive connector 60 to supply power to the light source electrode 53. The plurality of light sources 50 are arranged in parallel to each other on the entire rear surface of the liquid crystal panel. A cold cathode fluorescent lamp (CCFL) or a hot cathode fluorescent lamp (HCFL) may be used in the light source 50.

Both ends of the light source 50 may be inserted into the capacitive connector 60. The capacitive connector 60 is an element for stably and easily connecting the inverter 85 and the light source electrode 53. In an embodiment of the present invention, as shown in FIG. 4, the capacitive connector 60 includes a first conductive layer 61 covering the end portion of the light source 50, an insulation layer 62 covering an outer surface of the first conductive layer 61, and a second conductive layer 63 separated from the first conductive layer 61 with the insulation layer 62 interposed therebetween. The conductive layers may be made of any conductive material, for example, conductive metals. Such materials may be selected in order to achieve the desired capacitive characteristics.

The first and second conductive layers 61 and 63 also include a conductive polymer in which electricity may flow. Generally, the conductive polymer has characteristics such that it has a single bond and a double bond alternately. The conductive polymer is excellent in its process characteristics and light-weight, facilitating fabrication of the capacitive connector 60 in a desired shape and maintaining the light weight of the LCD device 100. The conductive polymer may include, for example, polyacetylene, polyaniline, polypyrrole and polythiopene, etc. The insulation layer 62 includes a dielectric substance.

With a structure in which the first and second conductive layers 61 and 63 act as electrodes that are separated at a certain interval and the dielectric material is inserted therebetween, the first conductive layer 61, the insulation layer 62 and the second conductive layer 63 form a capacitor with a certain capacitance. The capacitance formed by the capacitive connector 60 is determined by the distance (d) between the first and second conductive layers 61 and 63, their area, and a dielectric constant of the insulation layer 62 positioned therebetween, and these factors may be adjusted to obtain a desired capacitance. In order to obtain an overall uniform luminance by applying the same power to each light source 50, in the present invention, the plurality of capacitive connectors 60 may be formed to have substantially the same capacitance.

The first conductive layer 61 of the capacitive connector 60 is electrically connected with the light source electrode 53 via the connection pin 55, and the second conductive layer 63 is electrically connected with the inverter 85 via the support member 65, whereby power supplied from the inverter 85 may be supplied to the light source 50 via the capacitive connector 60.

In an embodiment of the present invention, the capacitive connector 60 serves to not only connect stably and easily the inverter 85 and the light source electrode 53 but also as a capacitor that properly distributes the power supplied from the inverter 85 to each light source 50. Further, the capacitive connector 60 may be made of a material with certain elasticity and softness, so that although an external impact is applied thereto, the capacitive connector 60 may absorb the impact to thus prevent degradation of the electrical connection between the light source 50 and the capacitive connector 60. Also, because the conductive polymer is elastic, the width of an inversion hole may be the same or smaller than that of the end portion of the light source 50 to more firmly connect the first conductive layer 61 and the light source electrode 53. In addition, the coupling of the light source 50 and the capacitive connector 60 may be completed by simply inserting the end portion of the light source 50 to the insertion hole of the capacitive connector 60, to thus improve the assembly process. Further, because there is no need to form an additional capacitor, the fabrication cost of the LCD device may be reduced. Also, the first and second layers may be made of the same or different materials or of materials with the same or different characteristics.

Meanwhile, when the CCFL or the HCFL is used as the light source 50, in order to drive the plurality of light sources 50 with a single inverter 85 to reduce the fabrication cost and the structure, the light sources 50 need to be connected in parallel. Thus, in an embodiment of the present invention, the support member 65 that connects the light sources 50 in parallel, electrically connects the capacitive connector 60 and the inverter 85 and stably supports the light source 50.

Figure 5:
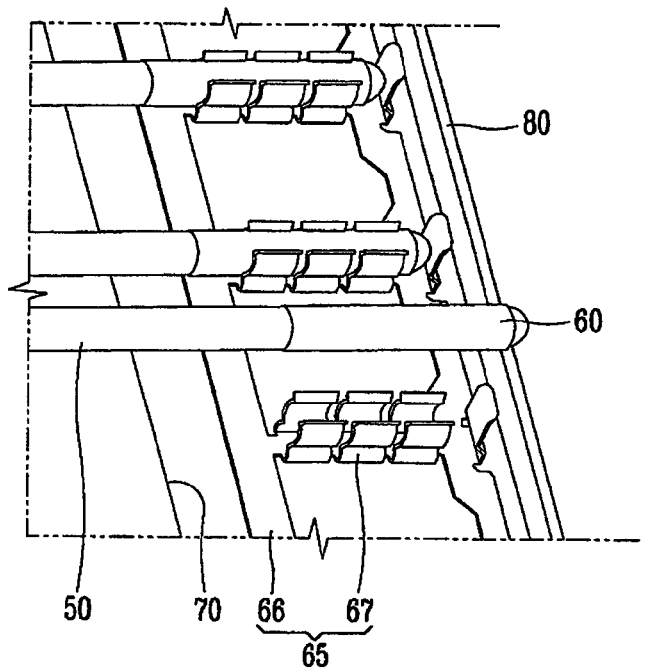
FIG. 5 is a view showing coupling relationship of a light source, the capacitive connector and the support member according to the first embodiment of the present invention.

In an embodiment of the present invention, as shown in FIGS. 2 and 5, the support member 65 includes a support main body 66, a plurality of sockets 67 covering at least a portion of an outer circumference of the capacitive connector 60, and a connection part (not shown) connecting the support main body 66 and the inverter 85. The support main body 66 and the plurality of sockets 67 are made of a conductive material and integrally formed, and the support main body 66 connects the plurality of sockets 67 in parallel.

The end portion of the light source 50 with the capacitive connector 60 is inserted and connected with each socket 67. The socket 67 has a ring shape with one side opened, and by pressing the capacitive connector 60 into the opened portion, the capacitive connector 60 may be easily inserted in the socket 67. The width (w) of the annular sockets 67 is substantially the same as or slightly smaller than the diameter (L) of the capacitive connector 60 to allow the socket 67 an the capacitive connector 60 to be firmly and tightly held. The connection part is an element for transferring power applied from the inverter 85 to the support main body part 66 and may be a type of a wire or a connection terminal. The support member 65 is located at both sides of the lower cover 80 corresponding to both end portions of the light source 50.

As shown in FIG. 2, the reflection sheet 70 is positioned between the light source 50 and the lower cover 80 and serves to reflect light of the light source 50 toward the diffusion film 45. The reflection sheet 70 may be made of polyethyleneterephthalate (PET) or polycarbonate (PC). The reflection sheet 70 is attached on the bottom surface of the lower cover 80.

The lower cover 80 accommodates the backlight unit 90 by being combined with the mold frame 25.

The inverter 85 may include a circuit pattern having a driving circuit for driving the light source 50 and an electronic component mounted on the circuit board.

As shown in FIG. 2, the inverter 85 may include a main inverter 85a positioned at one side of the rear surface of the lower cover 80 and a slave inverter 85b positioned at the other side thereof, and a flexible flat cable (not shown) connecting the main inverter 85a and the slave inverter 85b.

The main inverter 85a is connected with one side of the light source 50 via the support member 65 and the capacitive connector 60, and the slave inverter 85b is connected with the other side of the light source 50 via the support member 65 and the capacitive connector 60. The inverter 85 may also be formed as a single body, rather than being divided into the main inverter 85a and the slave inverter 85b.

The upper cover 90 includes a display window exposing a display region of the liquid crystal panel 10 that accommodates the liquid crystal panel 10 and the backlight unit 30 by being combined with the lower cover 80.

Figure 6:
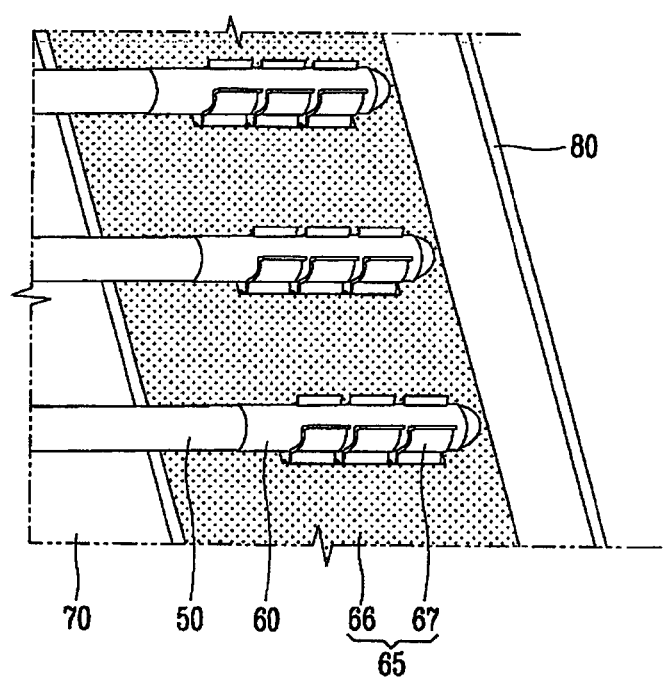
FIG. 6 is a view showing an LCD device according to a second embodiment of the present invention.

A second embodiment of the present invention will now be described with reference to FIG. 6.

In the second embodiment of the present invention, elements other than the support member 65 are the same as in the first embodiment of the present invention. The support member 65 in the second embodiment of the present invention includes a support main body part 66 and a socket 67.

The support main body part 66 is a PCB on which a plurality of circuit patterns is formed. As shown in FIG. 6, a plurality of insertion holes separated at uniform intervals are formed on the PCB, into which the socket 67 is inserted from the rear side of the insertion holes. The socket 67 is made of a conductive material such as metal. Each inserted socket 67 is electrically connected with the circuit patterns by soldering. Accordingly, the sockets 67 are separately mounted on the support main body part 66 and connected in parallel with each other by the plurality of circuit patterns.

The support main body part 66 that is the PCB is electrically connected with the inverter 85 via the connection part (not shown) such as the connection terminal or the wiring.

In the second embodiment of the present invention, the connection member 65 is stable compared with the first embodiment of the present invention. In the first embodiment of the present invention, the support member is entirely made of a conductive material so, there may be an external electrical impact or an interference with other elements may occur. But, in the second embodiment of the present invention, the support main body part 66 is provided as a PCB and the sockets 67 are connected by using the circuit patterns, stabilizing them structurally and electrically. In addition, because the required circuits may be formed on the PCB, the structure may become more stable and power may be effectively supplied to the light sources.

As so far described, the LCD device according to the present invention may improve the assembly process and connection stability and reduce the fabrication cost.

Also, the backlight unit according to the present invention may improve the assembly characteristics and assembly process and assembly connection and reduce the fabrication cost.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A capacitive connector for a backlight unit having a light source comprising:
    a first conductive layer covering and integrally formed around an end portion of the light source;
    an insulation layer covering an external surface of the first conductive layer; and
    a second conductive layer separated from the first conductive layer with the insulation layer interposed therebetween.

2. The capacitive connector of claim 1, wherein the second conductive layer is elastic.

3. The capacitive connector of claim 1, wherein the second conductive layer is a conductive polymer.

4. The capacitive connector of claim 3, wherein the conductive polymer is one of polyacetylene, polyaniline, polypyrrole and polythiopene.

5. The capacitive connector of claim 1, wherein the first conductive layer is elastic.

6. The capacitive connector of claim 1, wherein the first conductive layer is a conductive polymer.

7. A backlight unit for a display device comprising:
    a plurality of light sources;
    a plurality of capacitive connectors electrically connected to end portions of the light sources;
    a plurality of sockets into which capacitive connectors are inserted; and
    an inverter that supplies power to the light sources via the sockets and capacitive connectors,
    wherein the capacitive connectors include a first conductive layer covering and integrally formed around the end portion of the light source, an insulation layer covering an external surface of the first conductive layer and a second conductive layer separated from the first conductive layer with the insulation layer interposed therebetween.

8. The capacitive connector of claim 7, wherein the second conductive layer is elastic.

9. The capacitive connector of claim 7, wherein the second conductive layer is a conductive polymer.

10. The capacitive connector of claim 9, wherein the conductive polymer is one of polyacetylene, polyaniline, polypyrrole and polythiopene.

11. The capacitive connector of claim 7, wherein the first conductive layer is elastic.

12. The capacitive connector of claim 7, wherein the first conductive layer is a conductive polymer.

13. A method of manufacturing a backlight unit having a light source comprising: forming a capacitive connector by:
    forming a first conductive layer with an opening that connects to the light source;
    forming an insulation layer covering an external surface of the first conductive layer; and
    forming a second conductive layer separated from the first conductive layer with the insulation layer interposed therebetween,
electrically connecting the capacitive connector to an end portion of the light source; forming a socket; and inserting the capacitive connector into the socket connected to a power inverter.

* * * * *